(No Model.)

H. EVANS.
STRAINING APPARATUS.

No. 600,361. Patented Mar. 8, 1898.

Witnesses
Frank H. Anglin
A. M. Wilson

Inventor
Hannah Evans.
by Henry C. Evert.
Attorney

UNITED STATES PATENT OFFICE.

HANNAH EVANS, OF IDLEWOOD, PENNSYLVANIA.

STRAINING APPARATUS.

SPECIFICATION forming part of Letters Patent No. 600,361, dated March 8, 1898.

Application filed June 16, 1897. Serial No. 640,997. (No model.)

*To all whom it may concern:*

Be it known that I, HANNAH EVANS, a citizen of the United States of America, residing at Idlewood, in the county of Allegheny and State of Pennsylvania, have invented certain new and useful Improvements in Jelly-Strainers, of which the following is a specification, reference being had therein to the accompanying drawings.

This invention relates to certain new and useful improvements in strainers, and more particularly to that class known as "jelly-strainers."

The invention has for its object to provide novel and effective means for straining the juice from the fruits through a sack or cloth and retaining the body of the fruit within the sack.

It is a well-known fact that juice strained through a sack or cloth is clearer and more free from the body of the fruit than when strained through a perforated plate or other construction of sieve; and my invention resides in the novel means for holding the sack adapted to receive the fruit and for extracting the juice therefrom without direct contact with the hands, as is now required; and to this end the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
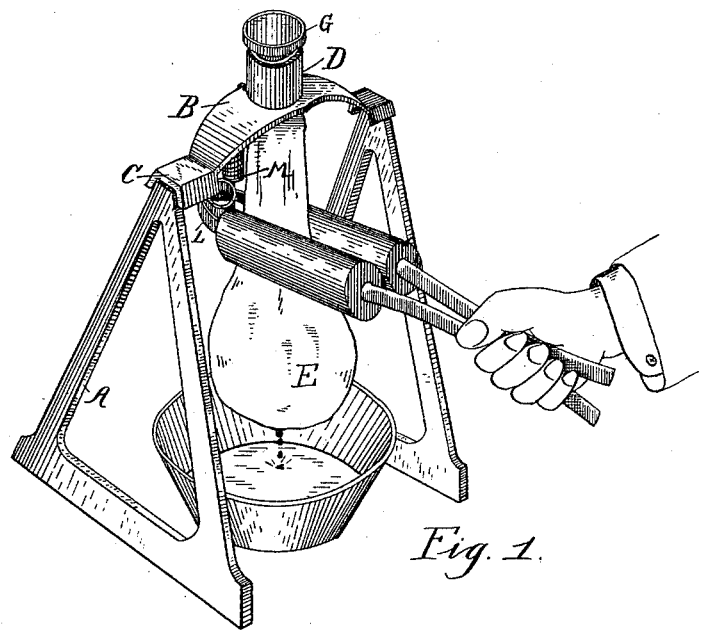
Figure 2:
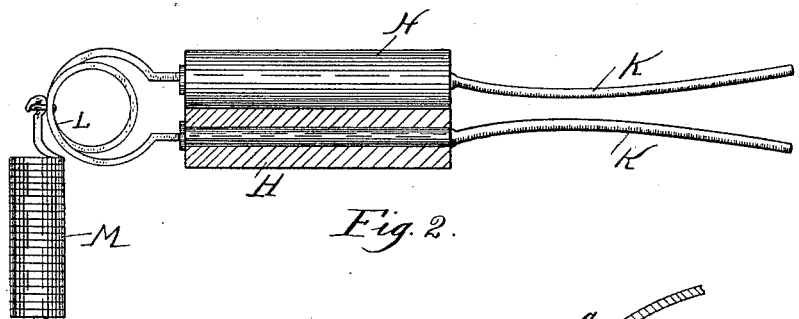
Figure 3:
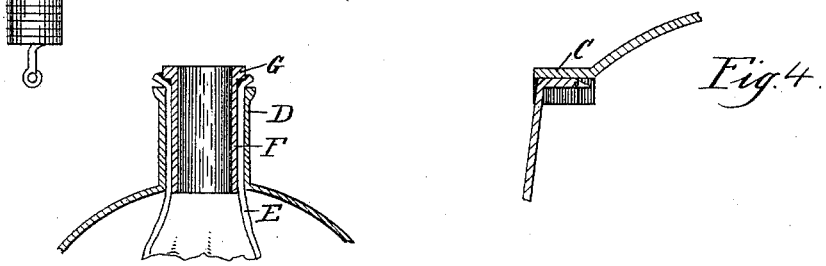
Figure 4:
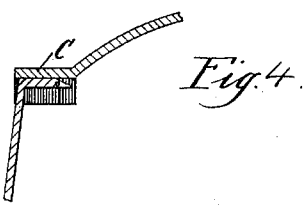

Figure 1 is a perspective view of my improved strainer, showing manner of operating. Fig. 2 is a plan view of the squeezing-rolls, partly in section. Fig. 3 is a vertical sectional view of a portion of the sack-support and sack. Fig. 4 is a similar view of a portion of the support.

To put my invention into practice, I provide two side braces A, of an inverted-V shape in form, which act as standards or supports for an arched yoke B, provided with box ends C, which engage upon the standards and may be secured thereto in any suitable manner. This yoke B carries an upwardly-extending collar or sleeve D, which receives the sack E, adapted to contain the fruit from which the juice is to be extracted. This sack E is held in the collar D by means of a sleeve F, which acts as a funnel, and over which the mouth of the sack E is drawn, said sleeve or funnel having at its top an annular flange G, which engages and binds the upper end of the sack on the upper end of the collar D. The juice is extracted from the fruit by means of rollers H, provided with handles K and connected at their rear by means of a spring L, the ends of which engage in the rear of the rollers, said spring being coiled so as to hold the two rollers normally in engagement with each other. These rollers are preferably supported from the yoke B by means of a coil-spring M, though other means of supporting the same may be employed.

The operation is as follows: The sack for holding the material to be strained is secured in the collar D by means of the sleeve F, said sleeve serving as a funnel. The juice is extracted by means of the rollers H, which are provided with handles K and connected at their rear ends by means of a spring to keep them normally in engagement with each other. The rollers are forced downwardly with the hands, and the operation is repeated until all the juice has been extracted.

It will be observed that various changes may be made in the details of construction without departing from the general spirit of my invention.

Having fully described my invention, what I claim as new, and desire to secure by Letters Patent, is—

1. In a strainer, the combination of the side braces, a yoke supported by said braces, said yoke having an upwardly-extending collar adapted to receive a sack, a sleeve forming a funnel and acting as a fastener to hold the sack in engagement with the collar, in combination with the pressure-rollers supported from the yoke, and adapted to engage the sack to extract the juice from the fruit contained therein.

2. A strainer consisting of a stand formed of side braces and a yoke supported by connecting-braces, said yoke being provided with an upwardly-extending collar adapted to receive a sack containing the fruit, a sleeve engaging within the sack to serve as a funnel and to hold the sack within the collar, in combination with the pressure-rollers supported from the yoke and adapted to engage the sack to extract the juice from the fruit contained therein.

In testimony whereof I affix my signature in presence of two witnesses.

HANNAH EVANS.

Witnesses:
 JOHN NOLAND,
 THOS. M. BOYD, Jr.